US012621689B2

(12) United States Patent
Lee et al.

(10) Patent No.: US 12,621,689 B2
(45) Date of Patent: May 5, 2026

(54) METHOD AND APPARATUS FOR MONITORING AND REPORTING AI MODEL IN WIRELESS COMMUNICATION SYSTEM

(71) Applicant: Samsung Electronics Co., Ltd., Gyeonggi-do (KR)

(72) Inventors: Changsung Lee, Gyeonggi-do (KR); Suhwook Kim, Gyeonggi-do (KR); Hyeondeok Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 500 days.

(21) Appl. No.: 18/075,808

(22) Filed: Dec. 6, 2022

(65) Prior Publication Data

US 2023/0403587 A1 Dec. 14, 2023

(30) Foreign Application Priority Data

Jun. 14, 2022 (KR) ........................ 10-2022-0071974

(51) Int. Cl.
| | |
|---|---|
| *H04W 24/08* | (2009.01) |
| *H04B 7/06* | (2006.01) |
| *H04W 28/06* | (2009.01) |

(52) U.S. Cl.
CPC .......... *H04W 24/08* (2013.01); *H04B 7/0632* (2013.01); *H04W 28/06* (2013.01)

(58) Field of Classification Search
CPC ..... H04B 7/0632; H04W 24/08; H04W 28/06
See application file for complete search history.

(56) References Cited

U.S. PATENT DOCUMENTS

| | | |
|---|---|---|
| 2021/0110261 A1 | 4/2021 | Lee et al. |
| 2021/0273707 A1 | 9/2021 | Yoo et al. |
| 2021/0297178 A1* | 9/2021 | Kim ...................... H04L 1/0026 |

(Continued)

FOREIGN PATENT DOCUMENTS

| | | |
|---|---|---|
| KR | 10-2012-0033283 | 4/2012 |
| KR | 10-2021-0042717 | 4/2021 |

(Continued)

OTHER PUBLICATIONS

Huawei, HiSilicon, "Discussion on AI/ML for CSI Feedback Enhancement", R1-2203141, 3GPP TSG RAN WG1 Meeting #109-e, May 9-20, 2022, 7 pages.

(Continued)

*Primary Examiner* — Brian P Cox
(74) *Attorney, Agent, or Firm* — The Farrell Law Firm, P.C.

(57) ABSTRACT

The disclosure relates to a 6th generation (6G) communication system for optimizing a network while being applied in various industrial fields through connection between 5th generation (5G) or beyond 5G things and networks for supporting a higher data rate. A method performed by user equipment (UE) in a wireless communication system is provided, including receiving configuration information related to an artificial intelligence (AI) model from a base station; performing monitoring of a first AI model of the UE for encoding and decoding channel state information (CSI); and reporting a monitoring result to the base station. The first AI model includes a first encoder and a first decoder of the UE, and the first decoder may be related to a second AI model of the base station including a second decoder.

19 Claims, 12 Drawing Sheets

650

(56) References Cited

U.S. PATENT DOCUMENTS

| 2022/0131589 | A1 | 4/2022 | Li et al. |
| 2022/0217062 | A1 | 7/2022 | Knapik et al. |
| 2023/0189030 | A1* | 6/2023 | Hindy ................... G06N 5/027 |
| | | | 370/252 |
| 2023/0283340 | A1* | 9/2023 | Niu ................... H04W 28/0215 |
| | | | 375/262 |
| 2023/0409963 | A1* | 12/2023 | Narayanan Thangaraj ................. |
| | | | G06N 3/098 |

FOREIGN PATENT DOCUMENTS

| KR | 1020210117611 | 9/2021 | |
| KR | 10-2021-0122798 | 10/2021 | |
| KR | 10-2022-0019560 | 2/2022 | |
| WO | WO 2019/240638 | 12/2019 | |
| WO | WO 2021/045748 | 3/2021 | |
| WO | WO-2021173579 A1 * | 9/2021 | ............. G06N 3/045 |

OTHER PUBLICATIONS

Moderator (Apple), "Summary 1 of Email Discussion on other Aspects of AI/ML for CSI", R1-2205467, 3GPP TSG-RAN WG1 Meeting #109-e, May 9-20, 2022, 75 pages.
Samsung, "Other Aspects on AI/ML for CSI Feedback Enhancement", R1-2203898, 3GPP TSG RAN WG1 #109-e, May 9-20, 2022, 8 pages.
International Search Report dated Feb. 24, 2023 issued in counterpart application No. PCT/KR2022/012657, 9 pages.
Extended European Search Search Report dated Sep. 16, 2025 issued on counterpart application No. PCT/KR2020/012657, pp. 13.
Moderator (Apple), "Summary #2 on other aspects of AI/ML for CSI enhancement", 3GPP TSG-RAN WG1 Meeting #109-e R1-2205556 e-Meeting, May. 9-May 20, 2022, pp. 97.

* cited by examiner

500

650

700

801

METHOD AND APPARATUS FOR MONITORING AND REPORTING AI MODEL IN WIRELESS COMMUNICATION SYSTEM

CROSS-REFERENCE TO RELATED APPLICATION(S)

This application is based on and claims priority under 35 U.S.C. § 119 to Korean Patent Application No. 10-2022-0071974, which was filed in the Korean Intellectual Property Office on Jun. 14, 2022, the entire disclosure of which is incorporated herein by reference.

BACKGROUND

1. Field

The disclosure relates generally to a wireless communication system and, more particularly, to a method and apparatus for monitoring and reporting an artificial intelligence (AI) model in a wireless communication system.

2. Description of Related Art

Considering the development of wireless communication from generation to generation, technologies have been developed for services targeting humans, such as voice calls, multimedia services, and data services. Following the commercialization of 5th generation (5G) communication systems, it is expected that the number of connected devices will exponentially grow. Increasingly, the devices and things will be connected to communication networks. Examples of connected things include vehicles, robots, drones, home appliances, displays, smart sensors connected to various infrastructures, construction machines, and factory equipment.

Mobile devices are expected to evolve in various form-factors, such as augmented reality glasses, virtual reality headsets, and hologram devices. To provide various services by connecting hundreds of billions of devices and things in the 6th generation (6G) era, there are ongoing efforts to develop improved 6G communication systems, which may also be referred to as beyond-5G systems.

6G communication systems, which are expected to be commercialized around 2030, are expected to have a peak data rate of tera (1,000 giga)-level bit per second (bps) and a radio latency that is less than 100 μsec, and thus, should be 50 times as fast as 5G communication systems and have ¹⁄₁₀ the radio latency thereof.

To accomplish such a high data rate and an ultra-low latency, it has been considered to implement 6G communication systems in a terahertz (THz) band (e.g., 95 gigahertz (GHz) to 3 THz bands). It is expected that, due to increased path loss and atmospheric absorption in the terahertz bands than those in mmWave bands introduced in 5G, technologies capable of securing the signal transmission distance (i.e., coverage) will become more crucial. Accordingly, it is important to develop, as technologies for securing the appropriate coverage, radio frequency (RF) elements, antennas, novel waveforms having a better coverage than orthogonal frequency division multiplexing (OFDM), beamforming and massive multiple-input multiple-output (MIMO), full dimensional MIMO (FD-MIMO), array antennas, and multiantenna transmission technologies such as large-scale antennas. In addition, new technologies are being discussed for improving the coverage of terahertz-band signals, such as metamaterial-based lenses and antennas, orbital angular momentum (OAM), and reconfigurable intelligent surface (RIS).

To improve the spectral efficiency and the overall network performances, various technologies have been developed for 6G communication systems, including: a full-duplex technology for enabling an uplink transmission and a downlink transmission to simultaneously use the same frequency resource at the same time; a network technology for utilizing satellites, high-altitude platform stations (HAPS), etc., in an integrated manner; an improved network structure for supporting mobile base stations and the like and enabling network operation optimization and automation and the like; a dynamic spectrum sharing technology via collision avoidance based on a prediction of spectrum usage; use of AI in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as mobile edge computing (MEC), clouds, etc.) over the network. In addition, through designing new protocols to be used in 6G communication systems, developing mechanisms for implementing a hardware-based security environment and safe use of data, and developing technologies for maintaining privacy, attempts continue to strengthen the connectivity between devices, optimize the network, promote softwarization of network entities, and increase the openness of wireless communications.

It is expected that research and development of 6G communication systems in hyper-connectivity, including person to machine (P2M) as well as machine to machine (M2M), will allow the next hyper-connected experience. Particularly, it is expected that services such as truly immersive extended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, channel state information (CSI) can be used to measure the state of a channel between a terminal and a base station. An AI model can be used to monitor and report the CSI more effectively. Accordingly, a way for managing the AI model efficiently is being considered.

SUMMARY

The disclosure has been made to address at least the above-mentioned problems and/or disadvantages and to provide at least the advantages described below.

An aspect of the disclosure is to provide an apparatus and method capable of providing services effectively in a mobile communication system.

In accordance with an aspect of the disclosure, a method is proved for a UE in a wireless communication system. The method includes receiving configuration information related to an AI model from a base station, monitoring a first AI model of the UE for encoding and decoding CSI, and reporting to the base station a result of the monitoring. The first AI model includes a first encoder and a first decoder of the user equipment, and the first decoder is related with a second AI model of the base station including a second decoder.

In accordance with another aspect of the disclosure, a UE is provided for use in a wireless communication system. The UE includes a transceiver and at least one processor coupled to the transceiver. The at least one processor is configured to receive configuration information related to an AI model from a base station; monitor a first AI model of the UE for encoding and decoding CSI; and report to the base station a result of the monitoring. The first AI model includes a first encoder and a first decoder of the user equipment, and the first decoder is related with a second AI model of the base station including a second decoder.

In accordance with another aspect of the disclosure, a method provided for a base station in a wireless communication system. The method includes transmitting configuration information related to an AI model to UE, and receiving a monitoring result from the UE. The monitoring result is related to a first AI model of the user equipment for encoding and decoding CSI, the first AI model includes a first encoder and a first decoder of the user equipment, and the first decoder is related with a second AI model of the base station including a second decoder.

In accordance with another aspect of the disclosure, a base station is provided for use in a wireless communication system. The base station includes a transceiver and at least one processor coupled to the transceiver. The at least one processor is configured to transmit configuration information related to an AI model to UE and receive a monitoring result from the UE. The monitoring result is related to a first AI model of the UE for encoding and decoding CSI, the first AI model includes a first encoder and a first decoder of the user equipment, and the first decoder is related with a second AI model of the base station including a second decoder.

BRIEF DESCRIPTION OF THE DRAWINGS

The above and other aspects, features, and advantages of certain embodiments will be more apparent from the following description taken in conjunction with the accompanying drawings, in which.

4

Figure 8A:
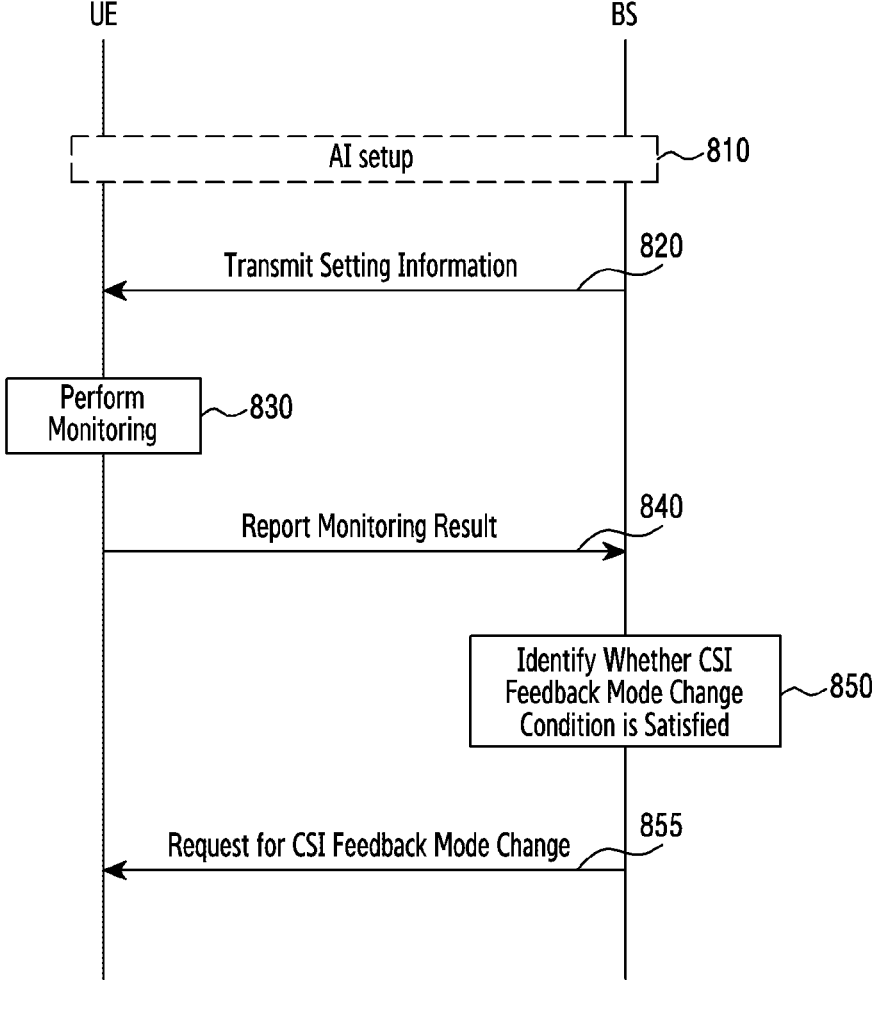
FIG. 8A illustrates a method for determining a CSI feedback mode of a UE including an AI model according to an embodiment.
Figure 8B:
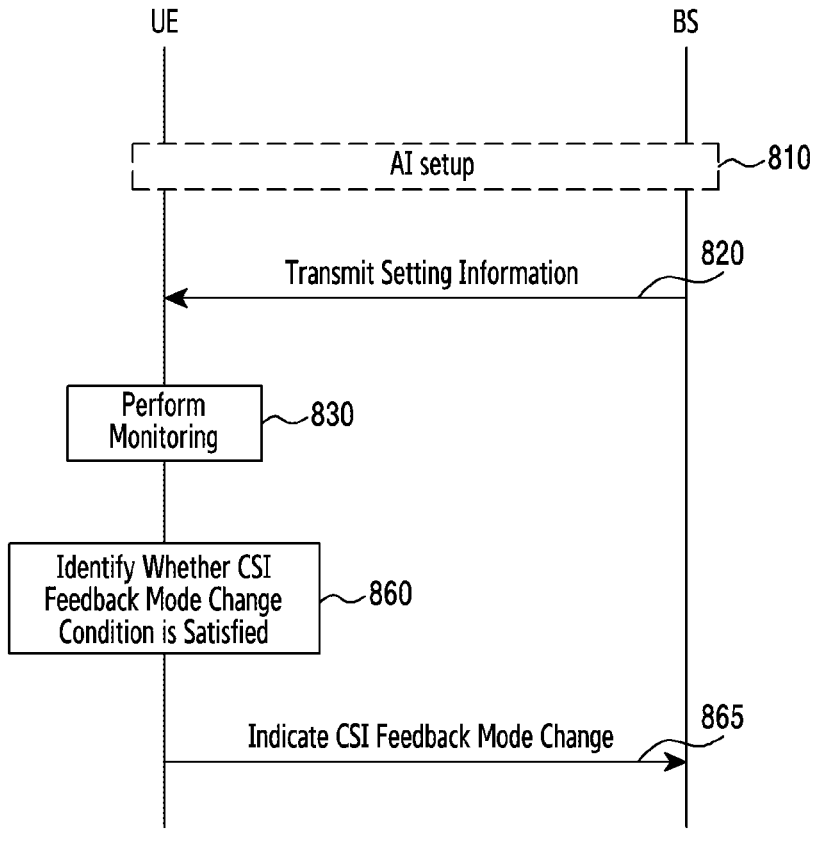

FIG. 8B illustrates a method for determining a CSI feedback mode of a UE including an AI model according to an embodiment.

DETAILED DESCRIPTION

Hereinafter, embodiments will now be described more fully with reference to the accompanying drawings. In the accompanying drawings, like reference numerals may denote like elements. Also, detailed descriptions of well-known functions and configurations in the art may be omitted when it is deemed that they may unnecessarily obscure the essence of the disclosure.

Terms used herein the present disclosure are only used to describe a specific embodiment, and may not be intended to limit the scope of other embodiments. Singular expressions may include plural expressions unless the context clearly dictates otherwise.

Terms used herein, including technical or scientific terms, may have the same meaning as commonly understood by a person having ordinary skill in the art described in the present disclosure. Additionally, terms defined in general dictionaries may be interpreted as having the same or similar meanings as those in the context of the related art, and are not interpreted as ideal or excessively formal meanings unless explicitly defined in the present disclosure. In some cases, even terms defined in the present disclosure may not be interpreted as excluding embodiments of the present disclosure.

In various embodiments, a hardware access method is described as an example. However, since various embodiments include technology using both hardware and software, various embodiments of the disclosure do not exclude software-based access methods.

Terms, e.g., control unit, processor, AI model, encoder, decoder, autoencoder (AE), neural network (NN) model, etc., that refer to components of a device used in the following description, and terms, e.g., signal, feedback, report, reporting, information, parameter, value, bit, codeword, etc., that refer to data are illustrated for convenience of description. Accordingly, the present disclosure is not limited to the terms described below, and other terms having equivalent technical meanings may be used.

Also, although the present disclosure describes various embodiments by using terms used in some communication standards (e.g., 3rd Generation Partnership Project (3GPP)), this is only an example for explanation. Various embodiments of the present disclosure may be easily modified and applied to other communication systems.

Figure 1:
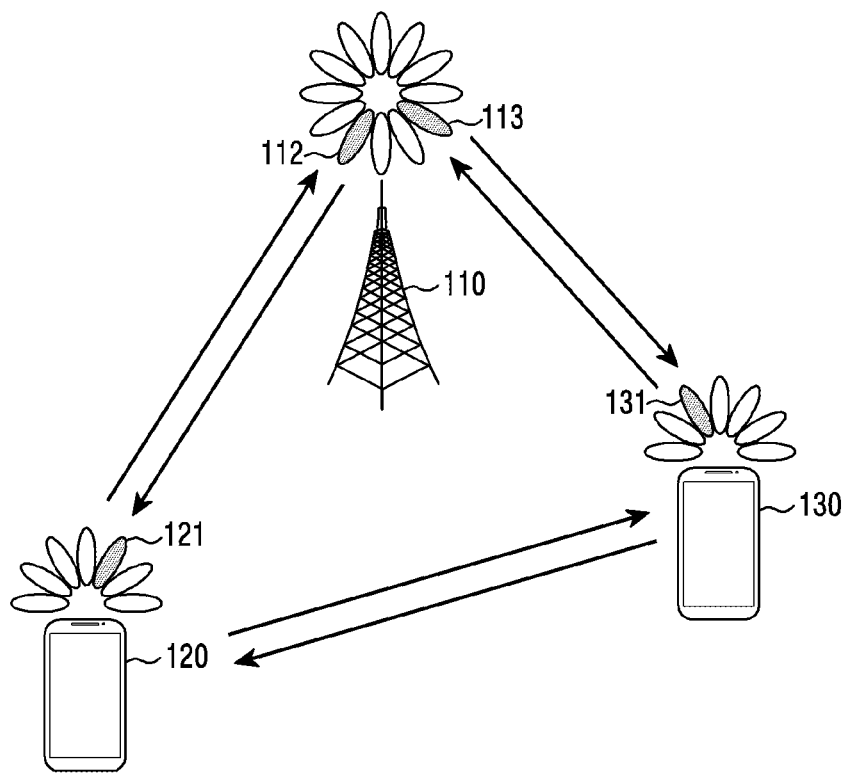
FIG. 1 illustrates a wireless communication environment according to an embodiment.

FIG. 1 illustrates a wireless communication system according to an embodiment. FIG. 1 exemplifies a base station 110, a terminal 120, and a terminal 130, as some of nodes using a wireless channel in a wireless communication system. Although FIG. 1 illustrates only one base station, other base stations identical or similar to the base station 110 may be further included.

The base station 110 is a network infrastructure that presents wireless access to the terminals 120 and 130. The base station 110 has coverage that is defined as a certain geographical area based on a distance over which signals may be transmitted. The base station, the base station 110 may also be referred to as an access point (AP), an eNodeB (eNB), a 5G node, a 6G node, a wireless point, a transmission/reception point (TRP), or other terms having equivalent technical meanings.

Each of terminal 120 and terminal 130 is a device used by a user and performs communication with the base station 110 through a wireless channel. In some cases, at least one of the terminal 120 and the terminal 130 may be operated without user involvement. That is, at least one of the terminal 120 and the terminal 130 is a device performing machine type communication (MTC), and may not be carried by a user. The terminal 120 and the terminal 130 may also be referred to as a UE, a mobile station, a subscriber station, a customer premises device (CPE), a remote terminal, a wireless terminal, an electronic device, a user device or other terms having equivalent technical meaning.

The base station 110, the terminal 120, and the terminal 130 may transmit and receive wireless signals in a mmWave band (e.g., 28 GHz, 30 GHz, 38 GHz, 60 GHz, over 60 GHz, etc.). At this time, to improve a channel gain, the base station 110, the terminal 120, and the terminal 130 may perform beamforming. Here, the beamforming may include transmit beamforming and receive beamforming. That is, the base station 110, the terminal 120, and the terminal 130 may establish directivity to a transmitted signal or a received signal. To this end, the base station 110 and the terminals 120 and 130 may select serving beams 112, 113, 121 and 131 through a beam search or beam management procedure. After the serving beams 112, 113, 121, and 131 are selected, communication may be performed through a resource having a quasi co-located (QCL) relationship with a resource transmitting the serving beams 112, 113, 121, and 131.

Figure 2:
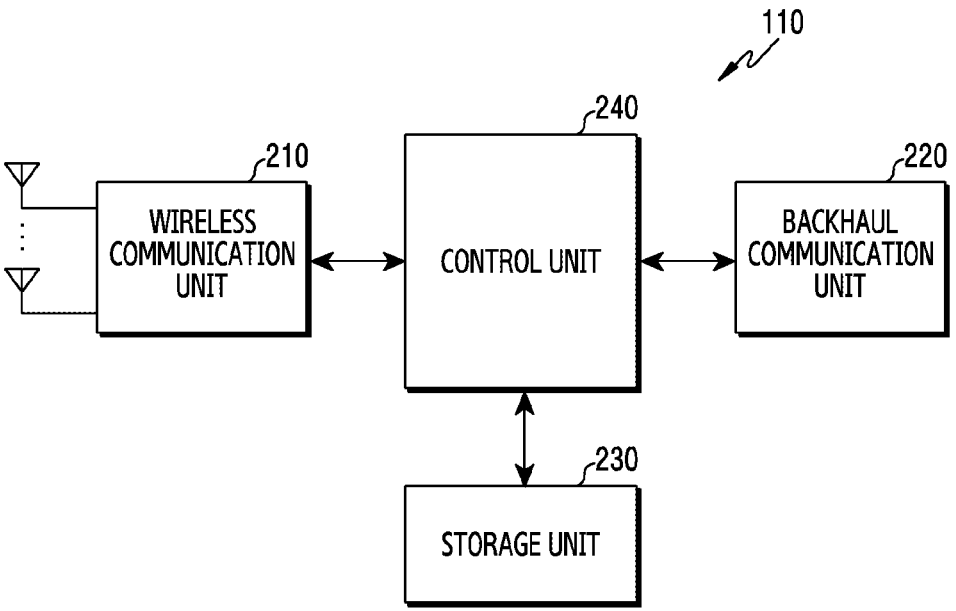
FIG. 2 illustrates a base station in a wireless communication system according to an embodiment.

FIG. 2 illustrates a base station in a wireless communication system according to an embodiment. The construction illustrated in FIG. 2 may be understood as a construction of the base station 110. Terms such as unit and part, as used herein, refer to a unit that processes at least one function or operation, which may be implemented by hardware, software, or a combination of hardware and software.

Referring to FIG. 2, the base station 110 includes a wireless communication unit 210, a backhaul communication unit 220, a storage unit 230, and a control unit 240.

The wireless communication unit 210 performs functions for transmitting and receiving signals through a wireless channel. For example, the wireless communication unit 210 performs a conversion function between a baseband signal and a bit stream according to a physical layer standard of the system. For example, when transmitting data, the wireless communication unit 210 provides complex symbols by encoding and modulating a transmission bit stream. Also, when receiving data, the wireless communication unit 210 restores a reception bit stream through demodulation and decoding of a baseband signal. Also, the wireless communication unit 210 up-converts a baseband signal into an RF band signal and transmits the signal through an antenna, and down-converts an RF band signal received through the antenna into a baseband signal.

To this end, the wireless communication unit 210 includes a transmission filter, a reception filter, an amplifier, a mixer, an oscillator, a digital to analog converter (DAC), an analog to digital converter (ADC), etc. Also, the wireless communication unit 210 includes a plurality of transmission and reception paths. Furthermore, the wireless communication unit 210 includes at least one antenna array composed of a plurality of antenna elements. In terms of hardware, the wireless communication unit 210 is composed of a digital unit (DU) and an analog unit, and the analog unit consists of a plurality of sub-units according to operation power, operation frequency, and the like.

The wireless communication unit 210 transmits and receives signals. To this end, the wireless communication unit 210 includes at least one transceiver. For example, the wireless communication unit 210 transmits a synchronization signal (SS), a reference signal (RS), system information, a message, control information, or data, etc. Also, the wireless communication unit 210 performs beamforming.

The wireless communication unit 210 transmits and receives signals as described above. Accordingly, all or part of the wireless communication unit 210 may be referred to as a transmitting unit, a receiving unit or a transceiving unit. Also, transmission and reception performed through a wireless channel mean that the above-described processing is performed by the wireless communication unit 210.

The backhaul communication unit 220 presents an interface for communicating with other nodes in a network. That is, the backhaul communication unit 220 converts a bit stream transmitted from the base station 110 to another node, for example, another access node, another base station, an upper node, a core network, etc., into a physical signal, and converts a physical signal received from the another node into a bit stream.

The storage unit 230 stores data such as a basic program for operation of the base station 110, an application program, and configuration information. The storage unit 230 includes a memory. The storage unit 230 may consist of a volatile memory, a non-volatile memory, or a combination of volatile and non-volatile memories. And, the storage unit 230 presents the stored data according to a request of the control unit 240. The storage unit 230 may store learning data for AI-based CSI feedback, and apply the stored learning data to an NN structure of the AI-based CSI feedback.

The control unit 240 controls overall operations of the base station 110. For example, the control unit 240 transmits and receives signals through the wireless communication unit 210 or the backhaul communication unit 220. Also, the control unit 240 writes data in the storage unit 230, and reads data. The control unit 240 may perform functions of a protocol stack required by communication standards. To this end, the control unit 240 includes at least one processor.

The construction of the base station 110, as shown in FIG. 2, is only one example of the base station, and an example of the base station performing various embodiments is not limited from the construction shown in FIG. 2. That is, some constructions may be added, deleted, or changed.

Although the base station is described as one entity in FIG. 2, the present disclosure is not limited thereto. Base stations of various embodiments of the present disclosure may be implemented to form an access network having a distributed deployment as well as an integrated deployment. The base station is divided into a central unit (CU) and a DU, and the CU may be implemented to perform an upper layer function (e.g., a packet data convergence protocol (PDCP) and radio resource control (RRC)), and the DU may be implemented to perform a lower layer function (e.g., medium access control (MAC) and physical (PHY)). The DU of the base station may form beam coverage on the wireless channel.

Figure 3:
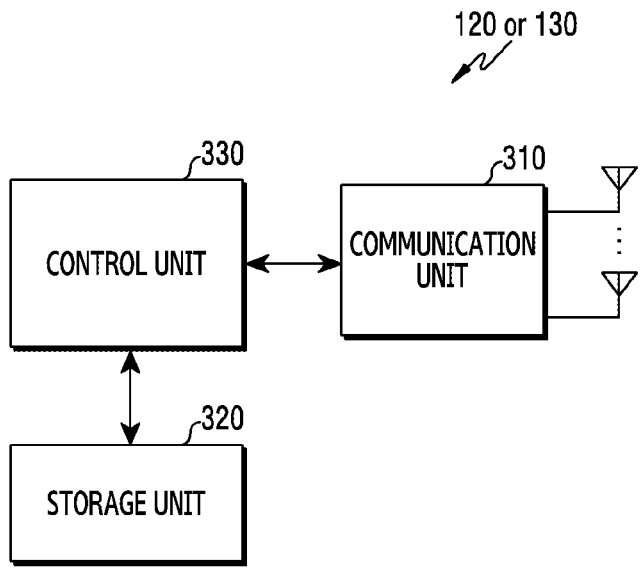
FIG. 3 illustrates a terminal in a wireless communication system according to an embodiment.

FIG. 3 illustrates a terminal in a wireless communication system according to an embodiment. The construction illustrated in FIG. 3 may be understood as constructions of the terminals 120 and 130. Terms such as unit and part may refer to a unit that processes at least one function or operation, which may be implemented by hardware, software, or a combination of hardware and software.

Referring to FIG. 3, the terminal 120 or 130 includes a communication unit 310, a storage unit 320, and a control unit 330.

The communication unit 310 performs functions for transmitting and receiving signals through a wireless channel. For example, the communication unit 310 performs a conversion function between a baseband signal and a bit stream according to a physical layer standard of the system. When transmitting data, the communication unit 310 provides complex symbols by encoding and modulating a transmission bit stream. Also, when receiving data, the communication unit 310 restores a reception bit stream by demodulating and decoding a baseband signal. Also, the communication unit 310 up-converts a baseband signal into an RF band signal and transmits the signal through an antenna, and down-converts an RF band signal received through the antenna into a baseband signal. For example, the communication unit 310 includes a transmission filter, a reception filter, an amplifier, a mixer, an oscillator, a DAC, an ADC, etc.

The communication unit 310 includes a plurality of transmission and reception paths. The communication unit 310 also includes an antenna unit. The communication unit 310 includes at least one antenna array composed of a plurality of antenna elements. In terms of hardware, the communication unit 310 includes a digital circuit and an analog circuit (e.g., an RF integrated circuit (RFIC)). Here, the digital circuit and the analog circuit may be implemented in one package. Also, the communication unit 310 includes a plurality of RF chains. The communication unit 310 may perform beamforming. To provide directivity based on the setting of the control unit 330 to a signal to be transmitted and received, the communication unit 310 applies a beamforming weight value to the signal. The communication unit 310 includes an RF block (or an RF unit). The RF block includes first RF circuitry related to an antenna and second RF circuitry related to baseband processing. The first RF circuitry may be referred to as an RF-antenna (RF-A). The second RF circuitry may be referred to as RF-baseband (RF-B).

The communication unit 310 transmits and receives signals and includes at least one transceiver. The communication unit 310 may receive a downlink signal. The downlink signal includes an SS, an RS (e.g., a cell-specific RS (CRS), and a demodulation (DM)-RS), system information (e.g., a master information block (MIB), system information block (SIB), remaining minimum system information (RMSI), and other system information (OSI)), a configuration message, control information, downlink data, etc. Also, the communication unit 310 may transmit an uplink signal. The uplink signal includes a random access related signal (e.g., a random access preamble (RAP) (or a message 1 (Msg1), a message 3 (Msg3)), an RD (e.g., a sounding RS (SRS), and DM-RS), a power headroom report (PHR), etc.

The communication unit 310 also includes different communication modules to process signals of different frequency bands. The communication unit 310 includes a plurality of communication modules to support a plurality of different wireless access technologies. For example, different radio access technologies includes Bluetooth™ low energy (BLE), wireless fidelity (Wi-Fi), WiFi gigabyte (Wi-Gig), cellular networks (e.g., long term evolution (LTE), and new radio (NR)), etc. Also, different frequency bands includes a super high frequency (SHF) (e.g., 2.5 GHz, 5 GHz) band, and/or a millimeter wave (e.g., 38 GHz, 60 GHz, etc.) band. The communication unit 310 may also use a wireless access technology of the same scheme on the different frequency bands (e.g., an unlicensed band for licensed assisted access (LAA), and a citizens broadband radio service (CBRS) (e.g., 3.5 GHz)).

The communication unit 310 transmits and receives signals as described above. Accordingly, all or part of the communication unit 310 may be referred to as a transmitting unit, a receiving unit or a transceiving unit. In the following description, transmission and reception performed through a wireless channel are used to mean that the above-described processing is performed by the communication unit 310.

The storage unit 320 stores data such as a basic program for operation of the terminal 120, an application program, configuration information, etc. The storage unit 320 may include a volatile memory, a non-volatile memory, or a combination of volatile and non-volatile memories. And, the storage unit 320 presents the stored data according to a request of the control unit 330. The storage unit 320 may store learning data for AI-based CSI feedback, according to a feedback format set by a base station.

The control unit 330 controls overall operations of the terminal 120 or 130. For example, the control unit 330 transmits and receives signals through the communication unit 310. Also, the control unit 330 writes data in the storage unit 320, and reads. Also, the control unit 330 may perform functions of a protocol stack required by communication standards. To this end, the control unit 330 includes at least one processor. The control unit 330 includes at least one processor or microprocessor, or may be a part of the processor. Also, a part of the communication unit 310 and the control unit 330 may be referred to as a control processor (CP). The control unit 330 includes various modules for performing communication. According to various embodiments, the control unit 330 may control the terminal to perform operations of various embodiments.

An AI model learned based on an NN may be operated through the control unit 330 and the storage unit 320. At this time, the control unit 330 may include one or a plurality of processors. The one or plurality of processors may be a general-purpose processor such as a central processing unit (CPU), an application processor, a digital signal processor (DSP), etc., a graphics-only processor such as a graphics processing unit (GPU) or a vision processing unit (VPU), or an AI-only processor such as a neutral processing unit (NPU). The one or plurality of processors may control to process input data, according to predefined operation rules or AI models stored in the storage unit 320. When the one or plurality of processors are the AI-only processors, the AI-only processors may be designed in a hardware structure specialized for processing a specific AI model. The AI-only processor may be omitted from the control unit 330, and may alternatively be included as a separate component.

The predefined operation rule or AI model is characterized in that it is established through learning. Here, established made through the learning means that the predefined operation rule or AI model that is set to perform a desired characteristic (or purpose) is made as a basic AI model is learned using a plurality of learning data by means of a learning algorithm. This learning may be performed in a device itself in which AI of the present disclosure is implemented, or may be performed through a separate server and/or system. An example of the learning algorithm includes supervised learning, unsupervised learning, semi-supervised learning, or reinforcement learning. The control unit 330 may learn occurring events, determined decisions, and collected or inputted information, through the learning algorithm. The control unit 330 may store these learning results in the storage unit 320 (e.g., memory).

The AI model may be composed of a plurality of NN layers. Each of the plurality of NN layers has a plurality of weight values, and performs a NN operation through operation between an operation result of a previous layer and the plurality of weight values. The plurality of weight values possessed by the plurality of NN layers may be optimized by a learning result of the AI model. For example, the plurality of weight values may be updated so that a loss value or a cost value acquired from the AI model is reduced or minimized during a learning process. The artificial NN includes a deep NN (DNN), e.g., a convolutional NN (CNN), a recurrent NN (RNN), a restricted Boltzmann machine (RBM), a deep belief network (DBN), a bidirectional recurrent deep NN (BRDNN), deep Q-Networks, etc., but is not limited to the above examples.

The control unit 330 may execute an algorithm for performing an operation related to an AI-based CSI feedback. The AI model that has learned to perform the operation related to the AI-based CSI feedback may be configured as hardware in the control unit 330, be included as software, or be configured through a combination of hardware and software. In other words, the control unit 330 includes an AI-based CSI feedback control unit. The AI-based CSI feedback control unit determines whether to monitor the AI model performing the AI-based CSI feedback, determines whether to report a monitored result, determines whether the AI model performing the AI-based CSI feedback fails, or determines whether to use the AI-based CSI feedback. The control unit 330 also includes an update unit that may acquire data (e.g., data related to CSI feedback between the terminal and the base station) that is updated by a learning procedure between the terminal and the base station, and based on this, may reconstruct values of parameters (e.g., an NN structure, information by node layer, and weight value information between nodes) constituting the NN. The AI-based CSI feedback control unit and the update unit may be instructions/codes at least temporarily residing at the control unit 330 as instruction sets or codes stored in the storage unit 320, or a storage space storing the instructions/codes, or may be part of circuitry constituting the control unit 330. The control unit 330 may control the terminal 120 or 130 to perform operations of the various embodiments.

The construction of the terminal 120 or 130 shown in FIG. 3 is only an example of the terminal, and the example of the terminal performing various embodiments of the present disclosure are not limited from the construction shown in FIG. 3. That is, according to various embodiments, some constructions may be added, deleted, or changed.

For convenience of description below, the present disclosure will be described based on the AI model included in the terminal 120 or 130. That is, an AI model including a specific NN structure and learned by a specific algorithm may be included in the terminal 120 or 130. However, the present disclosure is not limited thereto, and may also be applied to an AI model included in the base station 110.

Technologies related to AI-based CSI feedback include steps of learning and setting, based on a specific algorithm, to apply the CSI feedback to a specific AI model, collecting learning data required in a process in which the specific AI model learns, verifying the performance of the learned specific AI model, and the like. In particular, the present disclosure discloses a method and apparatus in which, in relation to the step of verifying the performance of a learned specific AI model, a terminal monitors the AI model and reports the monitoring result, thereby performing CSI feedback through an optimal AI model (hereinafter, referred to as a method for managing an AI model for CSI feedback).

In describing the method for managing the AI model for the CSI feedback, for the sake of convenience, the AI model is described by way of example of an AE. However, the present disclosure is not limited thereto, and may be applied to all AI models in which CSI compression is possible in performing CSI feedback. Here, the AE may mean an AI model including a bottleneck structure as a structure in which input and output are the same. The AE may compress a CSI measured by the terminal into a low-dimensional vector form. In other words, the terminal may provide a compressed CSI from a measured full CSI through an encoder of the AE, and transmit the compressed CSI to the base station. Accordingly, the base station may receive explicit CSI feedback instead of implicit CSI feedback. The AE has an advantage with respect to a scheme of feeding back through a CSI compression scheme. For example, even when inferring the performance of the AI model, the AE more accurately evaluates the AI model, based on knowledge of a ground-truth of a source of data. That is, since an input value of the AE is known, the performance of the AE may be measured by comparing an output value of the AE and the input value. In the case of the AE knowing the ground-truth of the original of the data, the AE may accurately predict what value will be outputted according to a value inputted to the AE. Also, since the AE has a high data dependency, the AE may also be used for anomaly detection for detecting unlearned data. However, since the AE (or AI model) is a data-based AI model, the stability of its performance may deteriorate. Therefore, the terminal may require a procedure for monitoring and reporting the accuracy (or reliability) of the AE to the base station. Thus, a management method for monitoring and reporting the AI model (e.g., the AE) for CSI feedback is provided.

Figure 4A:
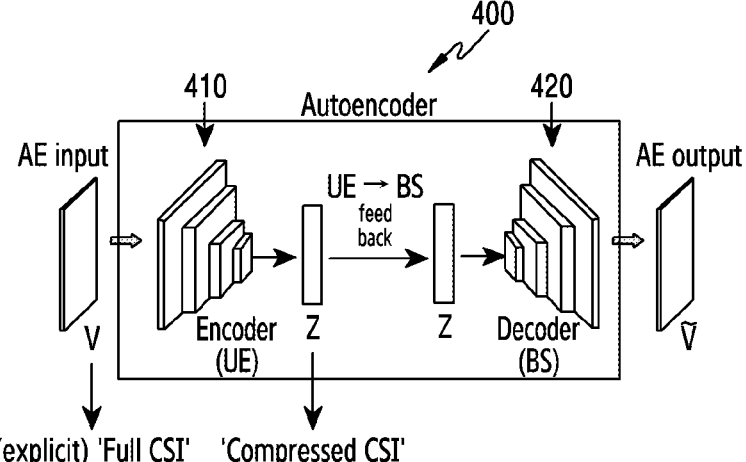
FIG. 4A illustrates a process of reporting CSI using an AI model in a wireless communication system according to an embodiment.

FIG. 4A illustrates a process of reporting CSI that uses an AI model in a wireless communication system according to an embodiment. In FIG. 4A, an AE is described as the AI model for reporting CSI (or CSI feedback) by way of example, but the present disclosure is not limited thereto. Here, it is assumed that the AE for reporting CSI is the AI model which has learned to report CSI, based on a specific learning algorithm.

Referring to FIG. 4A, an AE 400 may be an AI model that has learned CSI feedback between a UE and a base station. The UE may provide CSI by pre-processing information on a channel that is estimated based on a result of measuring a signal received from the base station. For example, the preprocessing includes eigen value decomposition (EVD) or singular value decomposition (SVD). Here, the provided CSI may mean full CSI. The full CSI may be inputted to an encoder 410 of the UE that is an input of the AE 400, and thus compressed CSI may be provided. The UE may transmit the compressed CSI to the base station, and the base station may restore the compressed CSI through a decoder 420. At this time, the decoder 420 of the base station may be an output of the AE 400. As described above, the AE 400 may learn CSI compression that is usable for CSI feedback between the UE and the base station. The AE 400 performs explicit CSI feedback rather than implicit CSI feedback through feedback of a learned CSI compression scheme. The CSI compression scheme requires the stable performance and high accuracy of the AE 400. Therefore, a procedure in which the UE reports a result of continuously and periodically monitoring and evaluating the performance of the AE 400 to the base station to thereby manage the AE 400 is required.

Figure 4B:
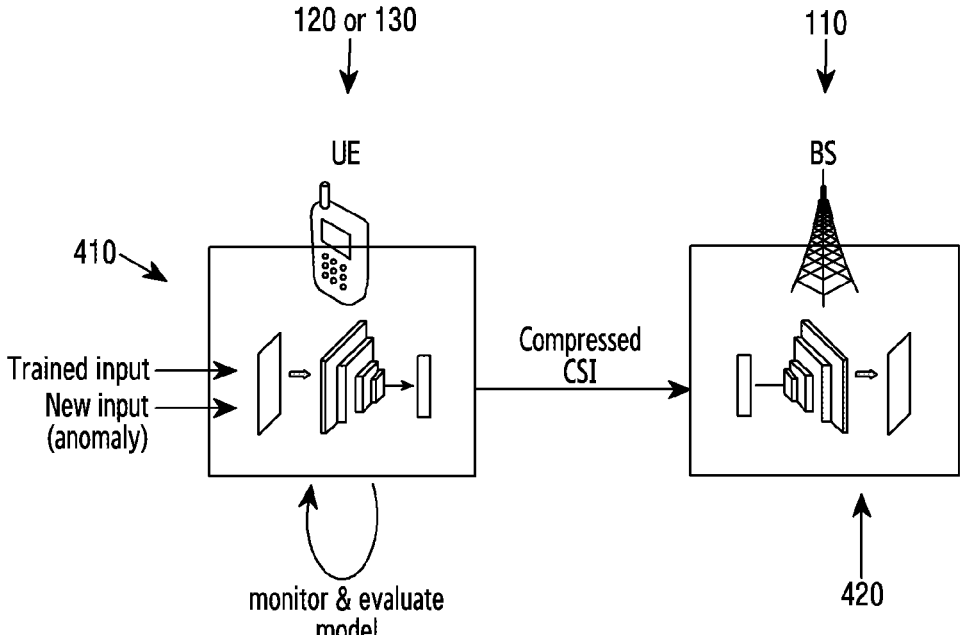
FIG. 4B illustrates a process in which a UE monitors an AI model according to an embodiment.

FIG. 4B illustrates a process in which a UE monitors an AI model according to an embodiment. In FIG. 4B, an AE is described as the AI model for reporting CSI (or CSI feedback) by way of example, but the present disclosure is not limited thereto. Here, it is assumed that the AE for reporting CSI is the AI model which has learned to report CSI, based on a specific learning algorithm.

Referring to FIG. 4B, the AE may be an AI model that has learned for CSI feedback between a UE and a base station. The UE 120 or 130 may receive a trained input value as an input of the AE. In addition, the UE 120 or 130 may receive untrained input values, that is, new input values (anomalies) as well. An encoder 410 of the UE 120 or 130 may receive trained input values and new input values. Based on the input values, the encoder 410 may provide CSI. Here, the provided CSI may mean full CSI. The full CSI may be inputted to the encoder 410 of the UE 120 or 130, which is an input of the AE, and thus compressed CSI is provided. The UE 120 or 130 transmits the compressed CSI to the base station 110, and the base station 110 restores the compressed CSI through a decoder 420. At this time, the decoder 420 of the base station 110 is an output of the AE 400. At this time, the UE 120 or 130 needs to again decode CSI provided by encoding the input values and compare the decoded CSI with the input values, thereby monitoring and evaluating an AI model currently in use, to evaluate the accuracy and reliability of the AI model. In other words, the UE 120 or 130 receive preset information on the decoder 420 of the base station 110, and measure the accuracy of the AI model by again decoding the encoded CSI (i.e., compressed CSI), thereby managing the AI model used by the UE 120 or 130 and the base station 110. Hereinafter, a method for managing the AI model for CSI feedback is described.

Figure 5:
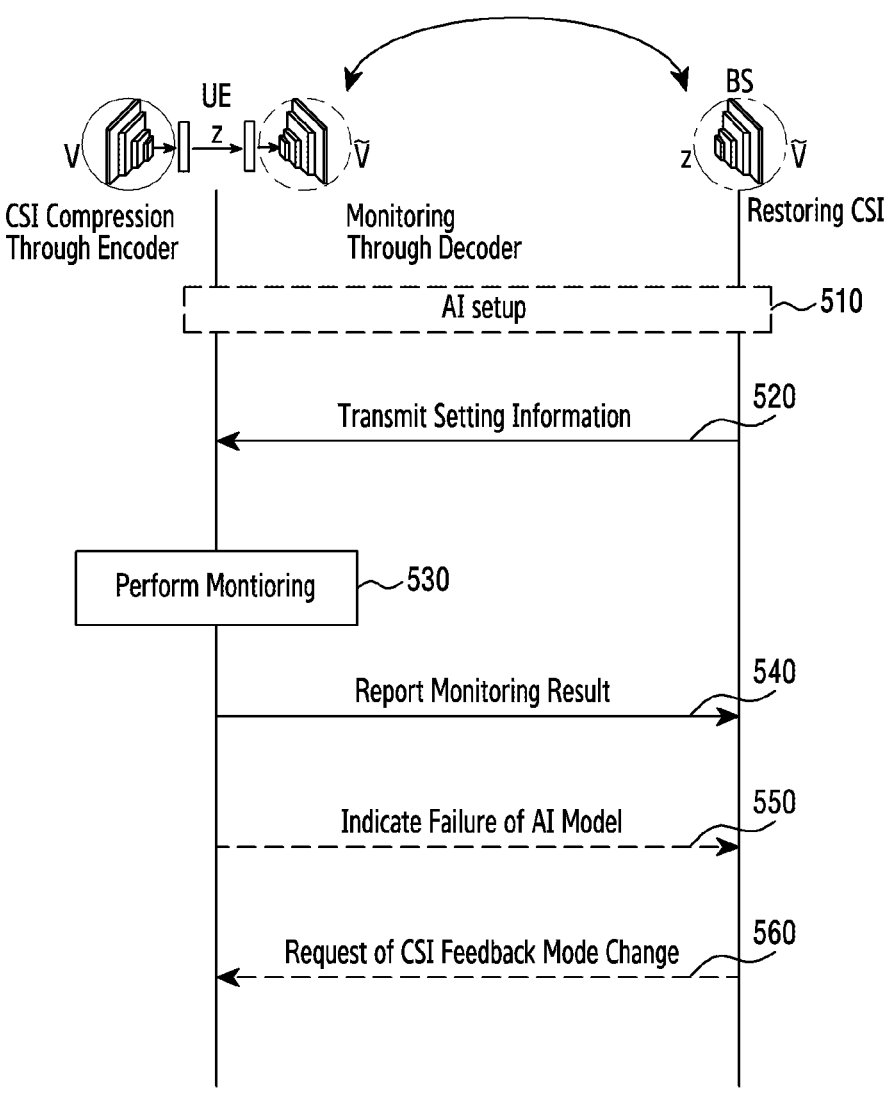
FIG. 5 is a flowchart illustrating a method for monitoring and reporting an AI model according to an embodiment.

FIG. 5 is a flowchart illustrating a method for monitoring and reporting an AI model according to an embodiment. In FIG. 5, an AE is described as the AI model for reporting CSI (or CSI feedback) by way of example, but the present disclosure is not limited thereto.

FIG. 5 illustrates a method 500 for monitoring the AI model and reporting the monitoring result between a base station and a UE, thereby managing the AI model. In FIG. 5, the AE used by the UE and the base station may be learned based on a specific learning algorithm to report CSI (i.e., CSI feedback). That is, the AI models of the UE and the base station may be learned according to the same learning algorithm and technique.

Referring to FIG. 5, in step 510, an encoder of the AE may be set to the UE, and a decoder of the AE may be set to the base station. In other words, the AI model of the UE may include the encoder, and the AI model of the base station may include the decoder. The decoder of the AE may also be set to the UE. That is, the AI model of the UE may include the decoder, and the decoder included in the AI model of the UE may be related to the decoder included in the AI model of the base station. The decoder of the AE may also be set to the UE in order for the UE to monitor, evaluate, and manage the AI model of the UE. However, in step 510, the decoder of the AE is not set to the UE, and in step 520, as described below, the decoder of the AE may be also set to the UE by transmitting information of the decoder through configuration information transmitted from the base station to the UE. In the above example, a case of one AE has been described as an example, but there may be a plurality of AEs. In other words, encoders of the plurality of AEs may be set to the UE, and decoders of the plurality of AEs may be set to the base station. Also, when the decoder of the AE may be set to the UE in step 510, the decoders of the plurality of AEs may be also set to the UE. For convenience of description, a general case of one AE is described as an example, but at least one AE may be configured and used in the UE and the base station.

In step 520, the base station transmits configuration information (or setting information) for evaluating the AI model, to the UE. Here, the configuration information for evaluating the AI model refers to information used to evaluate the AI model by determining a compression accuracy of the AI model. Here, the compression accuracy (hereinafter, referred to as accuracy) is determined by comparing inputted information with decoded and restored information, and determining how similar they are.

The configuration information includes information on the decoder of the AE. Here, the information on the decoder of the AE may mean information on the decoder of the AI model of the base station. For example, the information on the decoder of the AE includes information on a weight value of the decoder and a structure (e.g., the number of layers, the number of nodes, a connection relationship between layers or nodes, or an activation function, etc.) of the AI model. However, as described above, when the decoder of the AE is already set to the UE in step 510, the information on the decoder of the AE may not be included in the configuration information.

The configuration information may include an identifier of the AI model. That is, the base station may transmit information on an index of the AI model, which is an object to be evaluated, to the UE according to the configuration information. When a plurality of AI models are to be evaluated, an index of the AI model may be included in the configuration information in the form of a sequence. In this case, the configuration information may be set according to an index of each AI model, or information for mapping the configuration information and the index of the AI model may also be included.

The configuration information includes information on an interval for evaluating the AI model. In other words, the base station may indicate a time interval for which the UE monitors and evaluates the AI model. The interval for evaluating the AI model may be evaluated for all CSI compression results (i.e., compressed CSI), or be evaluated for periodic CSI compression results. For example, when the UE is set to evaluate all CSI compression results, the UE may monitor and evaluate all compressed CSI. As another example, when the UE is set to evaluate a periodic CSI compression result, the UE may monitor and evaluate every third compressed CSI. As further example, when the UE is set to evaluate the periodic CSI compression result, the UE may monitor and evaluate every second (e.g., even or odd) compressed CSI. However, this is only an example, and when the UE is set to evaluate the periodic CSI compression result, the UE may monitor and evaluate second, third, fourth, and fifth compressed CSI.

The configuration information includes a function (i.e., method) for evaluating the AI model. Here, the function for evaluating the AI model is a function for evaluating a compression accuracy of the AI model of the UE. For example, the function for evaluating the compression accuracy includes at least one of a mean squared error (MSE), a cosine similarity (CS), and a function for calculating an error.

The configuration information includes a type of reporting an evaluation result of the AI model. The type of reporting the evaluation result of the AI model may refer to a scheme of reporting an AI model result evaluated by the UE. The type of reporting the evaluation result includes a scheme of setting to report each evaluation result (i.e., always report), to report when an event occurs (i.e., event-based), or to periodically report (i.e., periodic). When information on the report type included in the configuration information is event-based, the configuration information includes a threshold value (hereinafter, referred to as a first threshold value) related to an accuracy for identifying whether a specific event has occurred. For example, when the accuracy determined based on the evaluation function is less than the first threshold value (e.g., 99%), the event may occur. That is, the first threshold value related to identification of a specific event may be 99%.

The configuration information includes a threshold value (hereinafter referred to as a second threshold value) and a timer (hereinafter, referred to as a first timer) for triggering an indication of an AI model failure. Whether the AI model fails is determined based on the second threshold value and the first timer. The second threshold value is a value of an evaluation result (accuracy) of the AI model. Also, the first timer may measure a duration for which the evaluation result of the AI model remains less than the second threshold value. The first timer may be started when the UE calculates the monitoring result of the AI model, and may expire after a specific time has lapsed. In other words, when the monitoring result of the AI model has a value that is less than the second threshold value during a time of the first timer, the UE may identify that the AI model has failed. Alternatively, the first timer may have a specific number of defined times, and when the monitoring result of the AI model has a value less than the second threshold value by the specific number of defined times of the first timer, the UE may identify that the AI model has failed.

The configuration information may include a threshold value (hereinafter referred to as a third threshold value) and a timer (hereinafter referred to as a second timer) for triggering the indication of a CSI feedback mode change. Whether to transmit the CSI feedback mode change indication may be determined based on the third threshold value and the second timer. The third threshold value may be a value of an evaluation result (accuracy) of the AI model. Also, the second timer may measure a duration for which the monitoring result of the AI model remains less than the third threshold value. The second timer may be started when the UE calculates the monitoring result of the AI model, and may expire after a specific time has elapsed. In other words, when the monitoring result of the AI model has a value less than the third threshold value during a time of the second timer, the UE may inform the base station that it will perform non-AI-based CSI feedback, without performing AI-based CSI feedback. Alternatively, the second timer may have a specific number of defined times, and when the evaluation result of the AI model has a value less than the third threshold value by the specific number of defined times of the second timer, the UE may inform the base station that it will perform the non-AI-based CSI feedback, without performing the AI-based CSI feedback.

Accordingly, the configuration information for evaluating the AI model transmitted from the base station to the UE includes at least one of the information on the decoder of the AE, the identifier of the AI model, the interval for evaluating the AI model, the function for evaluating the AI model, the type of reporting the monitoring result of the AI model, the threshold value and timer for triggering the indication of the AI model failure, or the threshold value and timer for triggering the indication of the CSI feedback mode change.

The base station transmits a message including the configuration information for evaluating the AI model to the UE in an initial access step. According to another embodiment, when the AI model that is used is changed, the base station may transmit the message including the configuration information for evaluating the AI model to the UE. For example, when the UE is handed over to another base station, the AI model is changed, and therefore another base station may transmit the message including the configuration information.

tion for evaluating the AI model to the UE. According to another embodiment, when requesting or indicating to use the AI-based CSI feedback, the base station may transmit the message including the configuration information for evaluating the AI model. According to a further embodiment, when a change of a setting on the evaluation of the AI model is requested, the base station may transmit the message including the configuration information for evaluating the AI model to the UE. For example, when a quality of service (QoS) is changed, the base station may transmit the message including the configuration information for evaluating the AI model to the UE.

In step 530, the UE monitors the AI model. The UE may measure CSI, based on an RS (e.g., a CSI-RS, etc.) received from the base station. Here, the measured CSI may be full CSI. The UE may compress the full CSI through the encoder of the AE, and restore the compressed CSI through the decoder of the AE. The UE may compare the full CSI and the restored CSI and monitor the compression accuracy of the AI model. At this time, the configuration information received from the base station may be used to monitor the compression accuracy of the AI model. In other words, the UE may monitor the AI model, based on the configuration information received from the base station. Further details of step 530 are provided with reference to FIG. 6A and FIG. 6B.

In step 540, the UE reports the monitoring result of the AI model to the base station. The UE transmits the accuracy of the AI model, which is the monitoring result performed in step 530, and the index of the AI model used, to the base station. Also, the UE may transmit the full CSI, together, for the sake of additional learning of the AE of the base station as well. A type in which the UE reports the monitoring result to the base station may be determined based on the configuration information. For example, the UE may transmit the compressed CSI to the base station at a current time (e.g., T1), and at the same time, may piggyback transmit the monitoring result of the evaluated AI model at a previous time (e.g., a time earlier than T1), together. This may be understood as the always report type of the monitoring result of the AI model. Also, when the evaluation result of the AI model is less than a specific threshold value (first threshold value), the UE may identify that an event has occurred, and may transmit the monitoring result of the AI model to the base station. This may be understood as the event-based report type of the monitoring result of the AI model. Also, the evaluation result of the AI model may be transmitted through a separate report message at specific intervals. This may be understood as the periodic report type of the monitoring result of the AI model.

In step 550, the UE indicates a failure of the AI model to the base station. Based on the result of monitoring in step 530 and the configuration information received from the base station, the UE may identify whether the AI model has failed. When the failure of the AI model is identified, the UE may transmit a message indicating discard (i.e., failure) of the AI model to the base station in step 550. Step 550 is optional and may be performed when the model failure is identified based on the result of monitoring in step 530 and the configuration information received from the base station. Additional details of step 550 are provided with reference to FIG. 7A and FIG. 7B.

In step 560, the base station may transmit a CSI feedback mode change request to the UE. The base station may determine whether to change a CSI feedback mode, based on the monitoring result received from the UE. Step 560 is optional and may be performed when the CSI feedback mode needs to be changed. Additional details of step 560 are provided with reference to FIG. 8A and FIG. 8B.

Figure 6A:
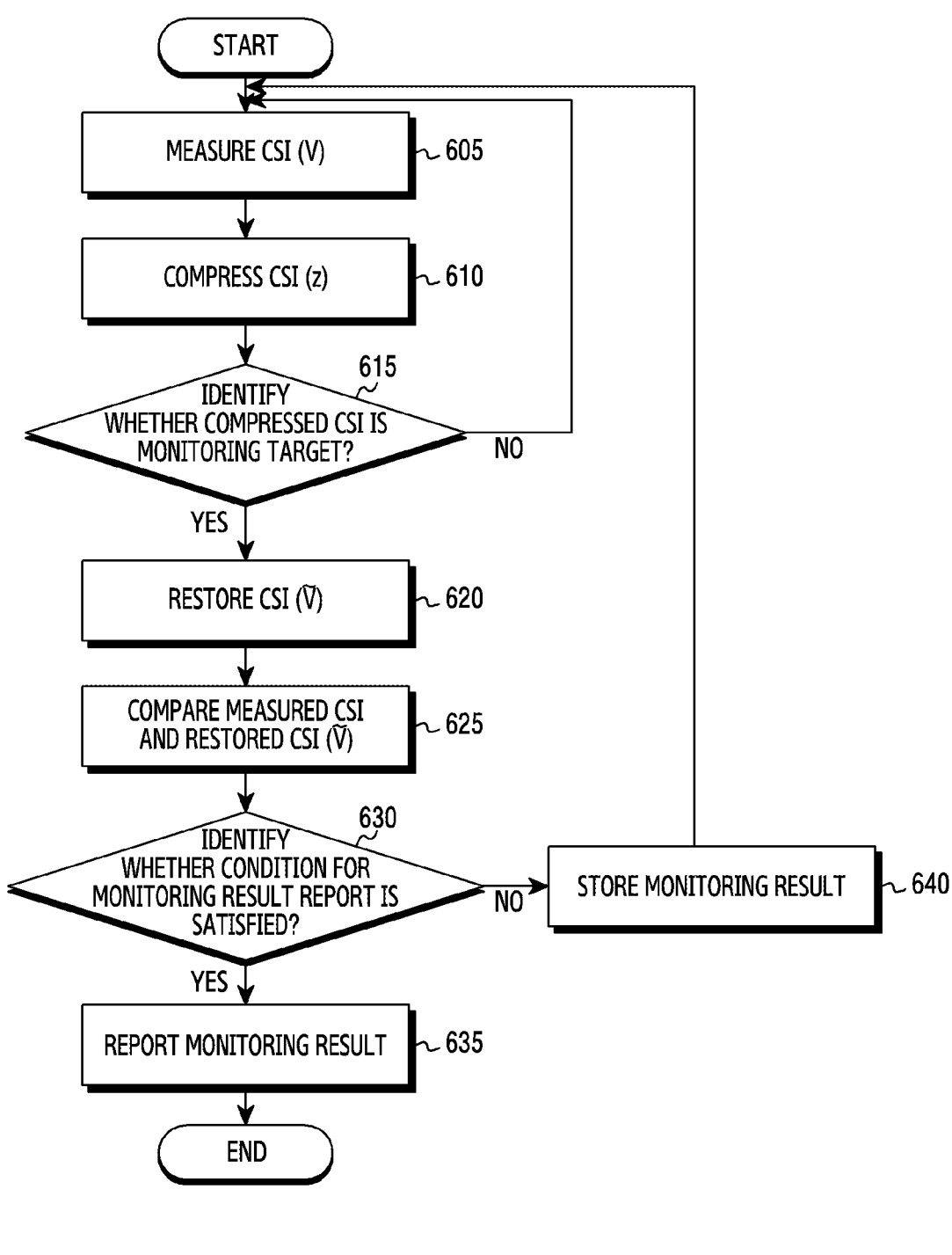
FIG. 6A is a flowchart illustrating a method in which a UE monitors an AI model according to an embodiment.

FIG. 6A is a flowchart illustrating a method in which a UE monitors an AI model according to an embodiment. In FIG. 6A, an AE is described as the AI model for reporting CSI (or CSI feedback) by way of example, but the present disclosure is not limited thereto.

FIG. 6A illustrates a method 600 including a detailed operation of step 530 of FIG. 5, regarding which the UE may receive an RS (e.g., a CSI-RS, etc.) for CSI measurement from a base station and measure CSI.

Referring to FIG. 6A, in step 605, the UE measures CSI based on the RS received from the base station. Here, the measured CSI may be full CSI (V). In step 610, for the full CSI, the UE compresses CSI (z) the full CSI through an encoder. Here, the encoder for compressing the CSI may mean an encoder of the AE that is the AI model. In step 615, the UE may identify whether the compressed CSI (z) is a monitoring target, based on configuration information received from the base station. When the UE is set to evaluate all compressed CSIs, based on the configuration information, the UE may identify current compressed CSI (z) as the monitoring target, and perform step 620. For another example, when the UE is set to monitor periodic compressed CSI, based on the configuration information, the UE may identify whether periodic compressed CSI (z) corresponds to a specific period according to the configuration information. When the UE is set to monitor every third compressed CSI (z), the UE may identify whether the currently compressed CSI (z) is the third compressed CSI (z). When the currently compressed CSI (z) corresponds to the third, the UE performs step 620. However, when the currently compressed CSI (z) corresponds to the first or the second, the UE returns to step 605, and measures and compresses a next full CSI (V).

In step 620, the UE restores the compressed CSI (z) through a decoder of the AE, which is set or is received through the configuration information. The restored CSI (v̂) may be provided by decoding the compressed CSI (z) through the decoder of the UE that is the same as the decoder of the AE used in a base station. In step 625, the UE compares the restored CSI (v̂) and the measured full CSI (V). Here, comparing the full CSI (V) and the restored CSI (v̂) may compare the accuracy between information (e.g., bits) of the full CSI (V) and information (e.g., bits) of the restored CSI (v̂) For example, when 991 bits of 1000 bits of the restored CSI (v̂) are the same as corresponding bits of 1000 bits of the full CSI (V) by comparing 1000 bits of the restored CSI (v̂) but the remaining 9 bits of the 1000 bits of the restored CSI (v̂) are different from corresponding bits of the 1000 bits of the full CSI (V), the accuracy may be 99.1%. However, this is only an example, and the UE may determine an error between the full CSI (V) and the restored CSI (v̂), based on a function for evaluating the AI model received through the configuration information.

In step 630, the UE may identify whether a condition for reporting the monitoring result is satisfied. The UE may identify whether the condition for reporting the monitoring result is satisfied based on similarity determined in step 625 and the configuration information. When the UE is set to an event-based monitoring result report type (event-based type), the UE may compare the currently determined accuracy (99.1%) and a threshold value (first threshold value) related to whether an event has occurred. When the first threshold value is 99%, since the currently determined accuracy has a value greater than the first threshold value, the UE may determine that the reliability of the AI model currently used is maintained. In this case, the UE may store the monitoring result in step 640, and return to step 605. However, when the currently determined accuracy has a value equal to or less than the first threshold value, the UE may determine that the reliability of the AI model currently used is not maintained. In this case, the UE may identify that the condition for reporting the monitoring result is satisfied, and the UE may report the monitoring result to the base station in step 635.

When the UE is set to report all monitoring results (always type), the UE will always enter step 635 and report the monitoring results to the base station. At this time, the UE is shown as reporting the monitoring result to the base station through step 635, but actually piggyback transmits the monitoring result to the base station together when transmitting compressed CSI (z) to the base station, as described in FIG. 6B, below.

When the UE is set to periodically report the monitoring results (periodic type), the UE may identify whether a current monitoring result is a report target. For example, when the period is set to 3, the UE may identify whether the current monitoring result corresponds to the third monitoring result, and in case of the third monitoring result, the UE may perform step 635. When it is not the third monitoring result, the UE may store the monitoring result in step 640, and return to step 605.

Figure 6B:
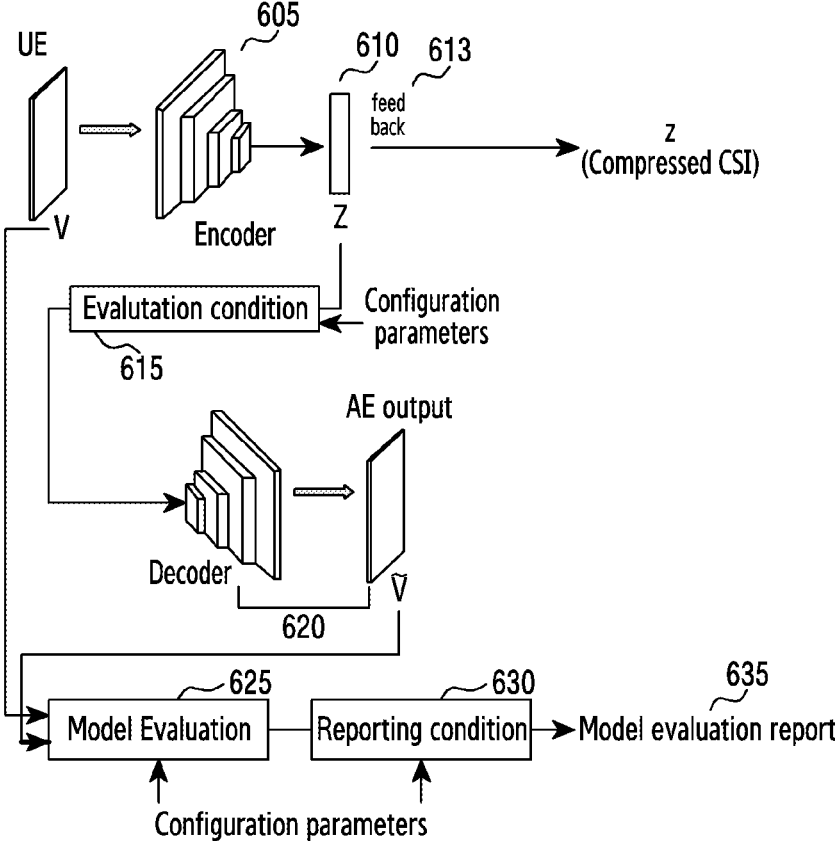
FIG. 6B illustrates a UE for monitoring an AI model according to an embodiment.

FIG. 6B illustrates a UE monitoring an AI model according to an embodiment. In FIG. 6B, an AE is described as the AI model for reporting CSI (or CSI feedback) by way of example, but the present disclosure is not limited thereto.

The method 650 illustrated in FIG. 6B provides a detailed operation of step 530 of FIG. 5 in relation to a structure of the UE. Here, the structure of the UE may mean a hardware structure, a software structure, or a combination of hardware and software. The method 650 of FIG. 6B may be understood substantially the same as the method 600 described in FIG. 6A and details are omitted for conciseness.

In step 605, the UE measures CSI based on an RS received from a base station. Here, the measured CSI may be full CSI (V). In step 610, for the full CSI, the UE compresses (z) the full CSI through an encoder. Here, the encoder for compressing the CSI may mean an encoder of the AE that is the AI model. Regarding step 613, the UE may feed back the compressed CSI (z) to the base station. At this time, when the monitoring result report type of the AI model of the UE is set as always-type, the UE may piggyback transmit the monitoring result of decoding and comparing full CSI received at a previous time (e.g., a time earlier than T1), together with transmitting compressed CSI (z) to the base station. Here, the compressed CSI (z) may be a compression of full CSI received at a current time (e.g., T1). That is, the UE may report the current compressed CSI (z) and the monitoring result of the previous time, to the base station, together. As described above, the monitoring result includes the monitoring result (i.e., accuracy) of the AI model, and an ID of the AI model used. The monitoring result may also include the full CSI (V) before the compression of the current compressed CSI (z). The full CSI (V) may be used for additional learning of the base station.

In step 620, the UE may restore the compressed CSI (z) through the decoder of the AE, which is set or is received through the configuration information. In step 625, the UE compares the measured full CSI (V) and the restored CSI (v̂). In step 630, the UE identifies whether a condition for reporting the monitoring result is satisfied. In step 635, the UE reports the monitoring result to the base station. Like step 640 of FIG. 6A, in FIG. 6B the UE may store the monitoring result when the condition is satisfied.

Figure 7A:
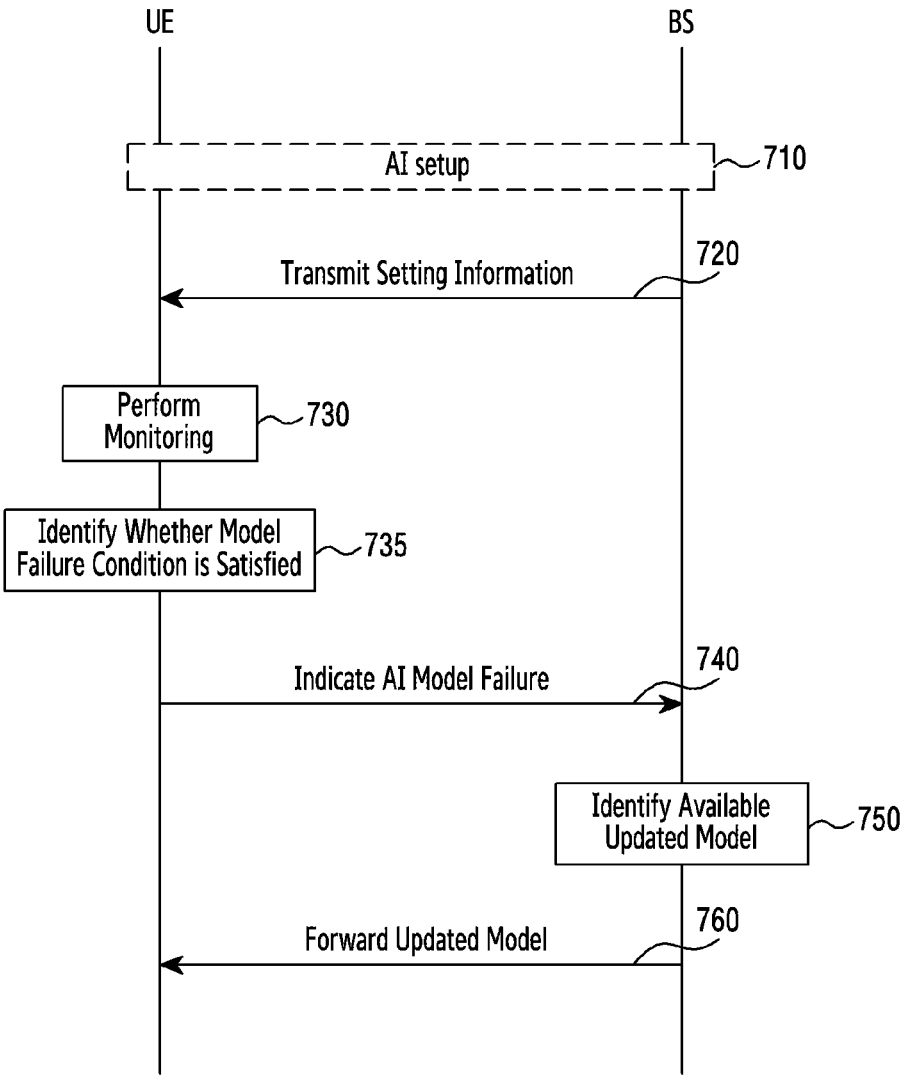
FIG. 7A illustrates a method of indicating a failure of an AI model according to an embodiment.

FIG. 7A illustrates a method of indicating a failure of an AI model according to an embodiment. In FIG. 7A, an AE is described as the AI model for reporting CSI (or CSI feedback) by way of example, but the present disclosure is not limited thereto.

FIG. 7A illustrates the method in which a UE indicates the failure of the AI model in relation to the method 500 of FIG. 5. The method 700 of FIG. 7A may be understood substantially of the method 500 described in FIG. 5 and details are omitted for conciseness.

Referring to FIG. 7A, in step 710, an encoder of the AE may be set to the UE, and a decoder of the AE may be set to a base station. In step 710, the decoder of the AE may also be set to the UE. The reason why the decoder of the AE is set to the UE may be that the UE monitors, evaluates, and manages the AI model. Unlike this, in step 710, the decoder of the AE is not set to the UE, and in step 720, the decoder of the AE may be set to the UE by transmitting decoder information through configuration information transmitted from the base station to the UE. In step 720, the base station may transmit the configuration information for evaluating the AI model to the UE. Here, the configuration information for evaluating the AI model may refer to information used to evaluate the AI model by determining a compression accuracy of the AI model. In step 730, the UE performs the monitoring of the AI model.

In step 735, the UE identifies whether a failure condition of the AI model is satisfied. The UE identifies whether the failure condition of the AI model is satisfied, based on the configuration information received from the base station. For example, the UE may determine based on a threshold value (second threshold value) and a timer (first timer) for triggering the indication of the AI model failure. The second threshold value may be a value of an evaluation result (accuracy) of the AI model. Also, the first timer may be a timer for measuring a duration for which the monitoring result of the AI model remains less than the second threshold value. When the monitoring result (accuracy) of the AI model has a value less than the second threshold value and is continued during a time of the first timer, the UE may identify that the failure condition of the AI model is satisfied. Here, the first timer may mean a specific time, or mean a specific number of times. Accordingly, when the monitoring result of the AI model is less than the second threshold value by the specific number of times indicated by the first timer, the UE may identify that the failure condition of the AI model is satisfied.

In step 740, the UE indicates a failure or non-failure of the AI model to the base station. When the failure of the AI model is identified in step 735, the UE transmits a message for indicating the failure (or discard) of the AI model to the base station. In step 750, the base station receiving the message indicating the failure of the AI model from the UE identifies whether there is an available updated AI model. In step 760, when the base station determines that there is the available updated AI model, the base station transmits information on the updated AI model to the UE. Accordingly, the UE newly sets the AI model, based on the received information on the AI model. Here, the information on the AI model may be an ID of the available updated AI model, which may indicate one of AI models which are preset in step 710.

Figure 7B:
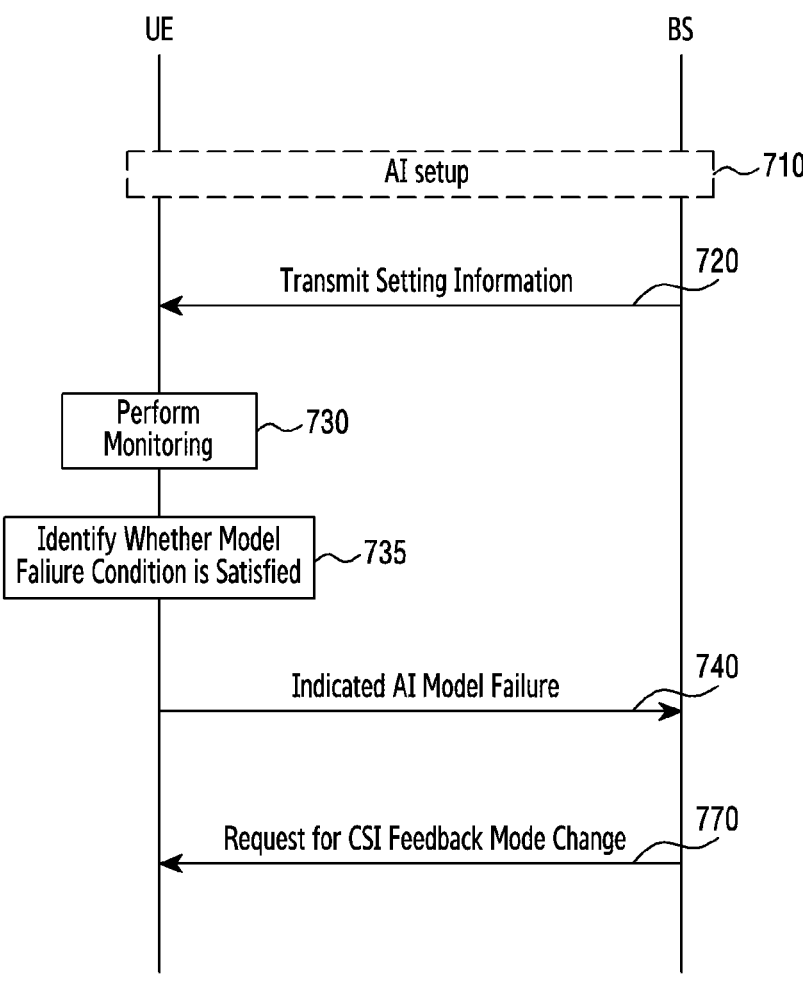
FIG. 7B illustrates a method of indicating a failure of an AI model according to an embodiment.

FIG. 7B illustrates a method of indicating a failure of an AI model according to an embodiment. In FIG. 7B, an AE is described as the AI model for reporting CSI (or CSI feedback) by way of example, but the present disclosure is not limited thereto.

FIG. 7B illustrates another example of the method in which a UE indicates a failure of the AI model in relation to the method 500 of FIG. 5. The method 705 of FIG. 7B may be understood substantially the same as the method 500 described in FIG. 5 and details are omitted for conciseness.

In step 710, an encoder of the AE may be set to the UE, and a decoder of the AE may be set to a base station. In step 710, the decoder of the AE may also be set to the UE. The reason why the decoder of the AE is set to the UE may be that the UE monitors, evaluates, and manages the AI model. Unlike this, in step 710, the decoder of the AE is not set to the UE, and in step 720, the decoder of the AE may be set to the UE by transmitting decoder information through the configuration information transmitted from the base station to the UE. In step 720, the base station transmits the configuration information for evaluating the AI model to the UE. Here, the configuration information for evaluating the AI model may refer to information used to evaluate the AI model by determining a compression accuracy of the AI model. In step 730, the UE performs the monitoring of the AI model.

In step 735, the UE identifies whether a failure condition of the AI model is satisfied. The UE may identify whether the failure condition of the AI model is satisfied, based on the configuration information received from the base station. For example, the UE may determine based on a threshold value (second threshold value) and a timer (first timer) for triggering the indication of the AI model failure. The second threshold value may be a value of the monitoring result (accuracy) of the AI model. Also, the first timer may be a timer for measuring a duration for which the monitoring result of the AI model remains less than the second threshold value. When the monitoring result (accuracy) of the AI model has a value less than the second threshold value and is maintained during a time of the first timer, the UE may identify that the failure condition of the AI model is satisfied. Here, the first timer may mean a specific time, or mean a specific number of times. Accordingly, when the monitoring result of the AI model is less than the second threshold value by the specific number of times indicated by the first timer, the UE may identify that the failure condition of the AI model is satisfied.

In step 740, the UE indicates a failure or non-failure of the AI model to the base station. When the failure of the AI model is identified, in step 740 the UE transmits a message for indicating the discard (i.e., failure) of the AI model to the base station. The base station receiving the message indicating the failure of the AI model from the UE may determine to perform non-AI-based CSI feedback, rather than AI based CSI feedback. Accordingly, in step 770, the base station transmits a message for requesting a CSI feedback mode change to the UE. The message for requesting the CSI feedback mode change includes an indicator for indicating whether it is the AI-based CSI feedback or the non-AI-based CSI feedback. For example, when a value is 1, the indicator may indicate the AI-based CSI feedback, and when the value is 0, the indicator may indicate the non-AI-based CSI feedback. Accordingly, in step 770, the base station may transmit, to the UE, the message including the indicator that is set as the value of 0.

FIG. 8A illustrates a method for determining a CSI feedback mode of a UE including an AI model according to an embodiment. In FIG. 8A, an AE is described as the AI model for reporting CSI (or CSI feedback) by way of example, but the present disclosure is not limited thereto.

FIG. 8A illustrates a base station determining the CSI feedback mode of the UE in relation to the method 500 of FIG. 5. The method 801 of FIG. 8A may be understood substantially the same as the method 500 described in FIG. 5 and details are omitted for conciseness.

Referring to FIG. 8A, in step 810, an encoder of the AE may be set to the UE, and a decoder of the AE may be set to the base station. In step 810, the decoder of the AE may also be set to the UE. The reason why the decoder of the AE is set to the UE may be that the UE monitors, evaluates, and manages the AI model. Unlike this, in step 810, the decoder of the AE is not set to the UE, and in step 820, the decoder of the AE may be set to the UE by transmitting decoder information through configuration information transmitted from the base station to the UE. In step 820, the base station transmits the configuration information for evaluating the AI model to the UE. Here, the configuration information for evaluating the AI model may refer to information used to evaluate the AI model by determining a compression accuracy of the AI model. In step 830, the UE performs monitoring of the AI model.

In step 840, the UE reports the monitoring result of the AI model to the base station. The UE may transmit the accuracy of the AI model, which is the monitoring result performed in step 830, and an index of the AI model used, to the base station. Also, according to some embodiments, the UE may transmit full CSI, together, for additional learning of the AE of the base station as well.

In step 850, the base station identifies whether a change condition for the CSI feedback mode is satisfied, based on the monitoring result. The base station may determine whether the CSI feedback mode change condition is satisfied, based on a timer (hereinafter, referred to as a third timer) for triggering a request for a CSI feedback mode change. For example, when the monitoring result reported by the UE set to the event-based report type is continuously received during a time of the third timer, the base station may determine not to perform AI-based CSI feedback. Here, the third timer may be started when the monitoring result is received, and may expire when a specific time has lapsed. Alternatively, the third timer may be defined as a specific number of times, and when the event-based monitoring results are received from the UE by the specific number of times, the base station may determine not to perform the AI-based CSI feedback. That is, the base station may determine to perform non-AI-based CSI feedback. In this case, the event-based report type may mean that the UE reports the monitoring result when a specific event occurs. The specific event may mean a case in which a compression accuracy value of the AI model is less than the first threshold value.

In step 855, the base station transmits a CSI feedback mode change request to the UE. The base station may determine whether to change the CSI feedback mode, based on the monitoring result report received from the UE. A message for the CSI feedback mode change request includes an indicator for indicating whether it is the AI-based CSI feedback or is the non-AI-based CSI feedback. For example, when a value is 1, the indicator may indicate the AI-based CSI feedback, and when the value is 0, the indicator may indicate the non-AI-based CSI feedback. Therefore, the base station transmits, to the UE, the message including the indicator that is set as the value of 0.

Also, in step 850, the base station may determine whether a change condition of the CSI feedback mode is satisfied, based on a threshold value (hereinafter, referred to as a fourth threshold value) and a timer (hereinafter, referred to as a fourth timer) for triggering a request for CSI feedback mode change. For example, when the monitoring result reported by the UE set as a periodic type is greater than the fourth threshold value and is continuously received during a time of the fourth timer, the base station may determine to perform the AI-based CSI feedback. Here, the fourth timer may be started when the monitoring result is received, and may expire when a specific time has lapsed. Or, the fourth timer may be defined as a specific number of times. When the monitoring result of the periodic report type from the UE is greater than the fourth threshold value and is received more than the specific number of times, the base station may determine to perform the AI-based CSI feedback. That is, the base station may determine to perform the AI-based CSI feedback.

In step 855, the base station transmits a CSI feedback mode change request to the UE. The base station may determine whether to change a CSI feedback mode, based on the monitoring result report received from the UE. A message for the CSI feedback mode change request includes an indicator for indicating whether it is the AI-based CSI feedback or is the non-AI-based CSI feedback. For example, when a value is 1, the indicator may indicate the AI-based CSI feedback, and when the value is 0, the indicator may indicate the non-AI-based CSI feedback. Accordingly, the base station transmits, to the UE, the message including the indicator that is set as the value of 1.

FIG. 8B illustrates a method for determining a CSI feedback mode of a UE including an AI model according to an embodiment. In FIG. 8B, an AE is described as the AI model for reporting CSI (or CSI feedback) by way of example, but the present disclosure is not limited thereto.

FIG. 8B illustrates an example of a method 802 in which the UE determines the CSI feedback mode of the UE in relation to the method 500 of FIG. 5. The method 802 of FIG. 8B may be understood substantially the same as the method 500 described in FIG. 5 and details are omitted for conciseness.

In step 810, an encoder of the AE may be set to the UE, and a decoder of the AE may be set to a base station. In step 810, the decoder of the AE may also be set to the UE. The reason why the decoder of the AE is set to the UE may be that the UE monitors, evaluates, and manages the AI model. Unlike this, in step 810, the decoder of the AE is not set to the UE, and in step 820, the decoder of the AE may be set to the UE by transmitting decoder information through configuration information transmitted from the base station to the UE. In step 820, the base station transmits the configuration information for evaluating the AI model to the UE. Here, the configuration information for evaluating the AI model may refer to information used to evaluate the AI model by determining a compression accuracy of the AI model. In step 830, the UE performs the monitoring of the AI model.

Unlike FIG. 8A, in step 860 of FIG. 8B, the UE may identify whether a change condition for the CSI feedback mode is satisfied, based on the monitoring result. The UE may determine whether the CSI feedback mode change condition is satisfied, based on a threshold value (third threshold value) and a timer (second timer) for triggering the indication of a CSI feedback mode change. For example, when the monitoring result is less than the third threshold value and is maintained during a time of the second timer, the UE may determine not to perform AI-based CSI feedback. That is, the UE may determine to perform non-AI-based CSI feedback.

In step 865, the UE transmits a CSI feedback mode change indication to the base station. A message for the CSI feedback mode change indication may include an indicator for indicating whether it is the AI-based CSI feedback or is the non-AI-based CSI feedback. For example, when a value is 1, the indicator may indicate the AI-based CSI feedback, and when the value is 0, the indicator may indicate the non-AI-based CSI feedback. Accordingly, in step 865, the UE may transmit, to the base station, the message including the indicator that is set as the value of 0.

Also, in step 860, the UE may determine whether a change condition for the CSI feedback mode is satisfied based on the threshold value (third threshold value) and the timer (second timer) for triggering the indication of the CSI feedback mode change. For example, in the UE performing the non-AI-based CSI feedback, when the monitoring result is greater than the third threshold value and is maintained during the time of the second timer, the UE may determine to perform the AI-based CSI feedback. That is, the UE may determine to perform the AI-based CSI feedback.

In step 865, the UE transmits the CSI feedback mode change indication to the base station. A message for the CSI feedback mode change indication may include an indicator for indicating whether it is the AI-based CSI feedback or is the non-AI-based CSI feedback. For example, when a value is 1, the indicator may indicate the AI-based CSI feedback, and when the value is 0, the indicator may indicate the non-AI-based CSI feedback. Accordingly, in step 885, the UE may transmit, to the base station, the message including the indicator that is set as the value of 1.

Referring to FIGS. 1 to 8B, a method for managing an AI model for CSI feedback of embodiments of the present disclosure, and an apparatus including the same, provide technologies capable of maintaining and managing by monitoring and reporting the accuracy of the AI model. In particular, in performing AI-based CSI feedback that reports CSI by using the AI model, the UE may use decoder information of a base station, to monitor the performance of the AI-based CSI feedback. Through the monitoring result, the UE may indicate a failure of the corresponding AI model, or indicate a change of a CSI feedback mode. Also, the base station may indicate the failure of the AI model or indicate the change of the CSI feedback mode, based on the monitoring result received from the UE. Accordingly, CSI feedback may be more effectively performed by selecting an AI model of excellent performance or determining a CSI feedback mode scheme of good performance.

That is, an apparatus and method of embodiments of the present disclosure more efficiently monitors an AI model of a UE and reports the monitoring result in a wireless communication system. Also, by monitoring the AI model of the UE in the wireless communication system, the present disclosure operates AI-based CSI feedback or non-AI-based CSI feedback. In addition, the effects obtainable through the present document are not limited to the effects mentioned above, and other effects not mentioned may be understood apparently by those skilled in the art to which the present disclosure pertains from the description below.

A method performed by UE in a wireless communication system of an includes receiving configuration information related to an AI model from a base station, performing the monitoring of a first AI model of the UE for encoding and decoding CSI, and reporting the monitoring result to the base station. The first AI model includes a first encoder and a first decoder of the UE, and the first decoder may be related with a second AI model of the base station including a second decoder.

The first AI model and the second AI model may be AEs.

The configuration information includes at least one of information on the decoder of the base station, an identifier of the first AI model, an interval for monitoring the first AI model, a method for monitoring the first AI model, and information on a type of reporting the monitoring result of the first AI model.

Performing the monitoring of the first AI model includes measuring at least one CSI, compressing the at least one CSI, identifying whether the compressed at least one CSI is a monitoring target, when the compressed at least one CSI is the monitoring target, restoring the compressed at least one CSI, and comparing between the measured at least one CSI and the restored at least one CSI.

Comparing between the measured at least one CSI and the restored at least one CSI may be a process of identifying whether a difference between the measured at least one CSI and the restored at least one CSI is than a first threshold value included in the configuration information.

The method may further include receiving a message of requesting to change into a non-AI-based CSI feedback mode from the base station, in response to transmitting, during a time corresponding to a third timer, the monitoring result which is transmitted when the accuracy of the first AI model of the monitoring result is less than the first threshold value.

The method may further include receiving a message of requesting to change into an AI-based CSI feedback mode from the base station, when the UE operates in the non-AI-based CSI feedback mode, when the accuracy of the first AI model of the monitoring result is greater than a fourth threshold value during a time corresponding to a fourth timer.

Reporting the monitoring result to the base station includes at least one of reporting together with a report of CSI compressed by the first encoder of the UE, reporting when a specific event occurs, or periodically reporting. The monitoring result includes the accuracy of the first AI model and an identifier of the first AI model.

The method may further include transmitting a message of indicating a failure of the first AI model to the base station, when the accuracy of the first AI model of the monitoring result is less than a second threshold value during a time corresponding to a first timer.

The method may further include transmitting a message of indicating a change into a non-AI-based CSI feedback mode to the base station, when the accuracy of the first AI model of the monitoring result is less than a third threshold value during a time corresponding to a second timer.

The method may further include transmitting a message of indicating a change into an AI-based CSI feedback mode to the base station, when the UE operates in the non-AI-based CSI feedback mode, when the accuracy of the first AI model of the monitoring result is greater than the third threshold value during the time corresponding to the second timer.

The method may further include setting at least one AIs including the first AI model, and each of the at least one AIs includes an encoder applied to the UE and a decoder applied to the base station.

The configuration information may further include information related to the second AI model of the base station, and the information related to the second AI model includes information on a weight value and a structure of the AI model.

The UE in a wireless communication system of an embodiment of the present disclosure includes a transceiver, and at least one processor coupled to the transceiver. The at least one processor may be configured to receive configuration information related to an AI model from a base station, perform the monitoring of a first AI model of the UE for encoding and decoding CSI, and report the monitoring result to the base station. The first AI model includes a first encoder and a first decoder of the UE, and the first decoder may be related with a second AI model of the base station including a second decoder.

The first AI model and the second AI model may be AEs.

The configuration information includes at least one of information on a decoder of the base station, an identifier of the first AI model, an interval for monitoring the first AI model, a method for monitoring the first AI model, and information on a type of reporting the monitoring result of the first AI model.

The at least one processor may be configured to measure at least one CSI, compress the at least one CSI, identify whether the compressed at least one CSI is a monitoring target, when the compressed at least one CSI is the monitoring target, restore the compressed at least one CSI, and compare between the measured at least one CSI and the restored at least one CSI.

The at least one processor may be configured to identify whether a difference between the measured at least one CSI and the restored at least one CSI is less than a first threshold value included in the configuration information.

The at least one processor may be configured to receive a message of requesting to change into a non-AI-based CSI feedback mode from the base station, in response to transmitting, during a time corresponding to a third timer, the monitoring result which is transmitted when the accuracy of the first AI model of the monitoring result is less than the first threshold value.

The at least one processor may be configured to receive a message of requesting to change into an AI-based CSI feedback mode from the base station, when the UE operates in the non-AI-based CSI feedback mode, when the accuracy of the first AI model of the monitoring result is greater than a fourth threshold value during a time corresponding to a fourth timer.

The at least one processor may be configured to report together with a report of CSI compressed by the first encoder of the UE, report when a specific event occurs, or periodically report. The monitoring result the accuracy of the first AI model and an identifier of the first AI model.

The at least one processor may be configured to transmit a message of indicating a failure of the first AI model to the base station, when the accuracy of the first AI model of the monitoring result is less than a second threshold value during a time corresponding to a first timer.

The at least one processor may be configured to transmit a message of indicating a change into a non-AI-based CSI feedback mode to the base station, when the accuracy of the first AI model of the monitoring result is less than a third threshold value during a time corresponding to a second timer.

The at least one processor may be configured to transmit a message of indicating a change into an AI-based CSI feedback mode to the base station, when the UE operates in the non-AI-based CSI feedback mode, when the accuracy of the first AI model of the monitoring result is greater than the third threshold value during the time corresponding to the second timer.

The at least one processor may be configured to set at least one AIs including the first AI model, and each of the at least one AIs includes an encoder applied to the UE and a decoder applied to the base station.

The configuration information may further include information related to the second AI model of the base station, and the information related to the second AI model includes information on a weight value and a structure of the AI model.

A method performed by a base station in a wireless communication system includes transmitting configuration information related to an AI model to UE, and receiving the monitoring result from the UE. The monitoring result is related to a first AI model of the UE for encoding and decoding CSI. The first AI model includes a first encoder and a first decoder of the UE. The first decoder may be related with a second AI model of the base station including a second decoder.

The first AI model and the second AI model may be AEs.

Methods described herein may be implemented in the form of hardware, software, or a combination of hardware and software.

When implemented in software, a computer-readable storage medium storing one or more programs (software modules) may be presented. The one or more programs stored in the computer-readable storage medium are configured to be executable by one or more processors in an electronic device. The one or more programs may include instructions for causing the electronic device to execute methods described herein.

Such programs (software modules and software) may be stored in a random access memory, a non-volatile memory including a flash memory, a read only memory (ROM), an electrically erasable programmable ROM (EEPROM), a magnetic disc storage device, a compact disc-ROM (CD-ROM), digital versatile discs (DVDs), other optical storage devices, or magnetic cassettes. Alternatively, the programs may be stored in a memory composed of a combination of some or all thereof. Also, each configuration memory may be included in plurality as well.

Also, the programs may be stored in an attachable storage device that may be accessed through a communication network such as the Internet, an intranet, a local area network (LAN), a wide area network (WAN), or a storage area network (SAN), or a communication network consisting of a combination thereof. This storage device may be connected to a device performing an embodiment of the present disclosure through an external port. Also, a separate storage device on the communication network may be connected to the device performing the embodiment of the present disclosure as well.

The disclosed embodiments provide an apparatus and method capable of providing services effectively in a mobile communication system.

In certain embodiments described above, components included in the disclosure are expressed as singular or plural according to the specific embodiments presented. However, the singular or plural expression is appropriately selected for the context presented for convenience of description, and the present disclosure is not limited to the singular or plural component, and even if a component is expressed as plural, it may be composed of singular, or even if the component is expressed as singular, it may be composed of plural.

While the disclosure has been particularly shown and described with reference to certain embodiments thereof, it will be understood by those of ordinary skill in the art that various changes in form and details may be made therein without departing from the spirit and scope of the disclosure as defined by the following claims and their equivalents.

What is claimed is:

1. A method performed by a user equipment (UE) in a wireless communication system, the method comprising:
   receiving, from a base station, configuration information related to a first artificial intelligence (AI) model of the UE and a second AI model of the base station, wherein the first AI model includes a first encoder of the UE and a first decoder of the UE;
   generating a plurality of channel state information (CSI) for monitoring the first AI model:
   compressing the plurality of CSI based on the first encoder:
   identifying whether at least one compressed CSI among the plurality of compressed CSI is a monitoring target, based on the configuration information:
   if the at least one compressed CSI is identified as the monitoring target, restoring the at least one compressed CSI based on the first decoder; and
   reporting, to the base station, a monitoring result of the first AI model based on comparing the at least one restored CSI and at least one corresponding CSI among the plurality of CSI,
   wherein the first decoder is related to the second AI model of the base station including a second decoder of the base station.

2. The method of claim 1, wherein the first AI model includes a first autoencoder and the second AI model includes a second autoencoder.

3. The method of claim 1, wherein the configuration information comprises at least one of an identifier of the first AI model, an interval for monitoring the first AI model, a method for monitoring the first AI model, or information on a type of reporting for the monitoring result of the first AI model.

4. The method of claim 1, wherein comparing the measured at least one CSI and the restored at least one CSI comprises:
   identifying whether a difference between the measured at least one CSI and the restored at least one CSI is less than a first threshold value in the configuration information.

5. The method of claim 4, further comprising:
   receiving, from the base station, a message requesting a change into a non-AI-based CSI feedback mode, in response to transmitting, during a third time period,
   wherein the monitoring result is transmitted when accuracy of the first AI model of the monitoring result is less than the first threshold value.

6. The method of claim 1, wherein reporting the monitoring result of the first AI model to the base station comprises at least one of:
   reporting the monitoring result of the first AI model together with a report of CSI compressed by the first encoder;
   reporting the monitoring result of the first AI model when a specific event occurs; or
   periodically reporting the monitoring result of the first AI model, and
   wherein the monitoring result of the first AI model comprises accuracy of the first AI model and an identifier of the first AI model.

7. The method of claim 1, further comprising:
   transmitting, to the base station, a message indicating a failure of the first AI model when accuracy of the first AI model is less than a second threshold value during a first time period.

8. The method of claim 7, further comprising:
   transmitting, to the base station, a message indicating a change into a non-AI-based CSI feedback mode when the accuracy of the first AI model is less than a third threshold value during a second time period.

9. The method of claim 8, further comprising:
   transmitting, to the base station, a message indicating a change into an AI-based CSI feedback mode when the UE operates in the non-AI-based CSI feedback mode, and when accuracy of the first AI model is greater than the third threshold value during the second time period.

10. The method of claim 1,
   wherein the configuration information comprises information on a weight value and a structure of the second AI model.

11. A user equipment (UE) in a wireless communication system, the UE comprising:
   at least one transceiver;
   at least one processor communicatively coupled to the at least one transceiver; and
   at least one memory, communicatively coupled to the at least one processor, storing instructions executable by the at least one processor individually or in any combination to cause the UE to:
   receive, from a base station, configuration information related to a first artificial intelligence (AI) model of the UE and a second AI model of the base station, wherein the first AI model includes a first encoder of the UE and a first decoder of the UE,
   generate a plurality of channel state information (CSI) for monitoring the first AI model,
   compress the plurality of CSI based on the first encoder,
   identify whether at least one compressed CSI among the plurality of compressed CSI is a monitoring target, based on the configuration information,
   if the at least one compressed CSI is identified as the monitoring target, restore the at least one compressed CSI based on the first decoder, and
   report, to the base station, a monitoring result of the first AI model based on comparing the at least one restored CSI and at least one corresponding CSI among the plurality of CSI,
   wherein the first decoder is related to the second AI model of the base station including a second decoder of the base station.

12. The UE of claim 11, wherein the first AI model includes a first autoencoder and the second AI model includes a second autoencoder.

13. The UE of claim 11, wherein the configuration information comprises at least one of an identifier of the first AI model, an interval for monitoring the first AI model, a method for monitoring the first AI model, or information on a type of reporting for the monitoring result of the first AI model.

14. A method performed by a base station in a wireless communication system, the method comprising:
   transmitting, to a user equipment (UE), configuration information related to a first artificial intelligence (AI) model of the UE and a second AI model of the base station, wherein the first AI model includes a first encoder of the UE and a first decoder of the UE; and
   receiving, from the UE, a monitoring result, wherein the monitoring result is based on a comparison between at least one restored channel state information (CSI) and at least one corresponding CSI, the at least one restored CSI being restored from at least one compressed CSI which corresponds to a monitoring target, wherein the at least one compressed CSI is compressed from the at least one corresponding CSI among a plurality of CSI of the UE, wherein the first decoder is related to a second decoder included in the second AI model of the base station, and wherein the monitoring result of the first AI model is based on a comparison between a first output from the first encoder and a second output from the first decoder.

15. The method of claim 14, wherein the first AI model includes a first autoencoder and the second AI model includes a second autoencoder.

16. The method of claim 14, wherein the configuration information comprises at least one of an identifier of the first AI model, an interval for monitoring the first AI model, a method for monitoring the first AI model, or information on a type of reporting for the monitoring result of the first AI model.

17. A base station in a wireless communication system, the base station comprising:

at least one transceiver;

at least one processor communicatively coupled to the at least one transceiver; and at least one memory, communicatively coupled to the at least one processor, storing instructions executable by the at least one processor individually or in any combination to cause the base station to:

transmit, to a user equipment (UE), configuration information related to a first artificial intelligence (AI) model of the UE and a second AI model of the base station, wherein the first AI model includes a first encoder of the UE and a first decoder of the UE; and receive, from the UE, a monitoring result, wherein the monitoring result is based on a comparison between at least one restored channel state information (CSI) and at least one corresponding CSI, the at least one restored CSI being restored from at least one compressed CSI which corresponds to a monitoring target, wherein the at least one compressed CSI is compressed from the at least one corresponding CSI among a plurality of CSI of the UE, wherein the first decoder is related to a second decoder included in the second AI model of the base station, and wherein the monitoring result of the first AI model is based on a comparison between a first output from the first encoder and a second output from the first decoder.

18. The base station of claim 17, wherein the first AI model includes a first autoencoder and the second AI model includes a second autoencoder.

19. The base station of claim 17, wherein the configuration information comprises at least one of an identifier of the first AI model, an interval for monitoring the first AI model, a method for monitoring the first AI model, or information on a type of reporting for the monitoring result of the first AI model.

* * * * *